(12) United States Patent
Kiernan et al.

(10) Patent No.: US 7,440,937 B2
(45) Date of Patent: *Oct. 21, 2008

(54) SELF JOIN ELIMINATION THROUGH UNION

(75) Inventors: Gerald George Kiernan, San Jose, CA (US); Jayavel Shanmugasundaram, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/495,251

(22) Filed: Jul. 28, 2006

(65) Prior Publication Data

US 2006/0265356 A1 Nov. 23, 2006

Related U.S. Application Data

(63) Continuation of application No. 09/887,759, filed on Jun. 21, 2001, now Pat. No. 7,107,255.

(51) Int. Cl.
*G06F 17/30* (2006.01)
(52) U.S. Cl. .............................................. 707/2; 707/3
(58) Field of Classification Search .................. 707/1–5, 707/7, 10, 100–102, 103 R, 104.1; 709/217, 709/219; 706/46, 47, 922
See application file for complete search history.

(56) References Cited

U.S. PATENT DOCUMENTS

| | | | |
|---|---|---|---|
| 5,345,585 A | 9/1994 | Iyer et al. | |
| 5,469,568 A * | 11/1995 | Schiefer et al. | 707/2 |
| 5,548,755 A | 8/1996 | Leung et al. | |
| 5,615,361 A * | 3/1997 | Leung et al. | 707/3 |
| 5,802,357 A * | 9/1998 | Li et al. | 707/2 |
| 5,822,750 A | 10/1998 | Jou et al. | |
| 5,899,992 A | 5/1999 | Iyer et al. | |
| 6,006,214 A | 12/1999 | Carey et al. | |
| 6,061,488 A | 5/2000 | Lhuillier et al. | |
| 6,061,676 A | 5/2000 | Srivastava et al. | |
| 6,324,533 B1 | 11/2001 | Agrawal et al. | |
| 6,339,768 B1 * | 1/2002 | Leung et al. | 707/2 |
| 6,397,204 B1 * | 5/2002 | Liu et al. | 707/2 |
| 6,438,741 B1 | 8/2002 | Al-omari et al. | |
| 6,526,403 B1 | 2/2003 | Lin et al. | |
| 6,546,381 B1 | 4/2003 | Subramanian et al. | |
| 6,691,101 B2 * | 2/2004 | MacNicol et al. | 707/2 |
| 6,711,560 B2 | 3/2004 | Levy et al. | |
| 6,721,725 B2 | 4/2004 | Levy et al. | |
| 6,725,227 B1 | 4/2004 | Li | |

(Continued)

OTHER PUBLICATIONS

George Koch et al., Oracle: The complete reference third edition, year 1995, McGraw-Hill, version 7, 701, and 7.2, pp. 253-266.*

(Continued)

*Primary Examiner*—Christian P. Chace
*Assistant Examiner*—Jacques Veillard
(74) *Attorney, Agent, or Firm*—Gates & Cooper LLP

(57) ABSTRACT

A query optimization technique that determines whether a query includes a self join that is transitively derived through table expressions having UNION operators. If so, the query is simplified to eliminate the table expressions and to reduce the query to an equivalent query over tables.

24 Claims, 8 Drawing Sheets

U.S. PATENT DOCUMENTS

| | | | |
|---|---|---|---|
| 6,745,174 | B2 | 6/2004 | Sherman et al. |
| 2006/0101001 | A1* | 5/2006 | Lindsay et al. .................. 707/3 |
| 2006/0101044 | A1* | 5/2006 | Liu et al. .................... 707/101 |
| 2006/0235840 | A1* | 10/2006 | Hanikutty et al. .............. 707/4 |

OTHER PUBLICATIONS

Richard A. Ganski et al., "Optimization of nested SQL Queries Revisites" 1987 Proc. of ACM SIGMOD Conference, pp. 23-33.*

A. Swami: "Optimization of Large Join Queries" Combining Heuristics and Combinatorial techniques, Proc. of 1989, ACM-SIGMOD, pp. 367-376.*

Y. Ioannidis et al., "Randomized Algorithm for Optimizing Large Join Queries", Proc. of 1990, ACM-SIGMOD, pp. 312-321.*

G.M. Lohman et al., 1990, IBM Technical Disclosure Bulletin, "Extensible Design for Generating Alternative Join Sequences in a Relational Query Optimizer," 32(11):317-318.

Software Patent Institute Database of Software Technologies, 1990, "Extensible Design for Generating Alternative Join Sequences In a Relational Query Optimizer," IBM TDB, Database enty Copyright © Software Patent Institute, pp. 3.

Informix Guide to SQL: Tutorial, version 9.1; Chapter 3: Composing Advanced Select Statements; 1998; 16 pp. http://www-306.ibm.com/software/data/informix/pubs/library/datablade/dbdk/sqlt/03.fm2 . . . .

George Koch et al.: Oracle: The complete Reference, third edition, 1995 Osborne McGraw-Hill, pp. 253-266.

George Kock et al.: Oracle "The complete Reference, third edition; 1995Mcgraw-Hill; versions 7, 7.1, and 7.2, pp. 253-266".

* cited by examiner

SELF JOIN ELIMINATION THROUGH UNION

CROSS-REFERENCE TO RELATED APPLICATION

This application is a continuation of U.S. patent application Ser. No. 09/887,759, filed Jun. 21, 2001 now U.S. Pat. No. 7,107,255, by Gerald G. Kiernan and Jayavel Shanmugasundaram, entitled "SELF JOIN ELIMINATION THROUGH UNION," which application is incorporated by reference herein.

BACKGROUND OF THE INVENTION

1. Field of the Invention

This invention relates in general to database management systems performed by computers, and in particular, to the optimization of queries that include self joins.

2. Description of Related Art

Since its introduction, XML, the eXtended Markup Language, has quickly emerged as a universal format for publishing and exchanging data over the World Wide Web. However, problems still exist in publishing data from object-relational databases as XML documents.

In the business-to-business e-commerce area, there is a widely recognized need to create XML documents by combining one or more object-relational tables, e.g., by creating an XML purchase order by joining a customer with information drawn from other tables. A relational join is a well known operation that combines information from two base tables by creating pairs of matching rows that are related using a predicate.

In comparison with simple select queries over a single table, join queries are costly in terms of system performance and much research has been done to optimize these queries. Query rewrite optimizations can sometimes be used to transform join queries into simple select queries.

For example, if a join is a self join, and the join predicate links the two quantifiers on the table's key columns, the query can be rewritten into a simple select. This is illustrated using the following example:

SELECT E1.SAL, E2.SAL
FROM EMP E1, EMP E2
WHERE E1.NO=E2.NO

The query selects the salaries of employees on matching values of attribute NO. Since NO represents employee numbers and it is also the table's key, each row represented by quantifier E1 will only match with itself in E2. Therefore, the above query can safely be rewritten as the following query, preserving its semantics:

SELECT E1.SAL, E1.SAL
FROM EMP E1

The principle of self join elimination can be extended beyond simple queries, such as the example above, to include more complex queries. Commercial database management systems, such as DataBase 2 (DB2™) Universal DataBase (UDB™) sold by IBM Corporation, the assignee of the present invention, implement a number of different query rewrite transformations, which enhances the performance of such queries.

However, there is still a need for improved techniques at optimizing self joins. Specifically, there is a need in the art for transformations of self joins that are transitively derived through table expressions which themselves cannot be simplified using a SELECT-MERGE query rewrite optimization.

SUMMARY OF THE INVENTION

To overcome the limitations in the prior art described above, and to overcome other limitations that will become apparent upon reading and understanding the present specification, the present invention discloses a method, apparatus, and article of manufacture for optimizing self join queries. The query optimization technique determines whether a query includes a self join that is transitively derived through table expressions having UNION operators. If so, the query is simplified to eliminate the table expressions and to reduce the query to an equivalent query over the tables.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

An XML middleware system presents relational databases as XML repositories. Queries against the XML representation of the databases are expressed in X-Query, a query language developed to query XML documents. The XML middleware system may optimize the X-Query statements using an optimization technique known as Self Join Elimination Through Union. The XML middleware system translates the optimized X-Query statements into SQL queries that can be executed by a relational database management system (RDBMS). When the query results are returned by the RDBMS, the XML middleware system renders the query results as one or more XML documents.

Hardware and Software Environment

Figure 1:
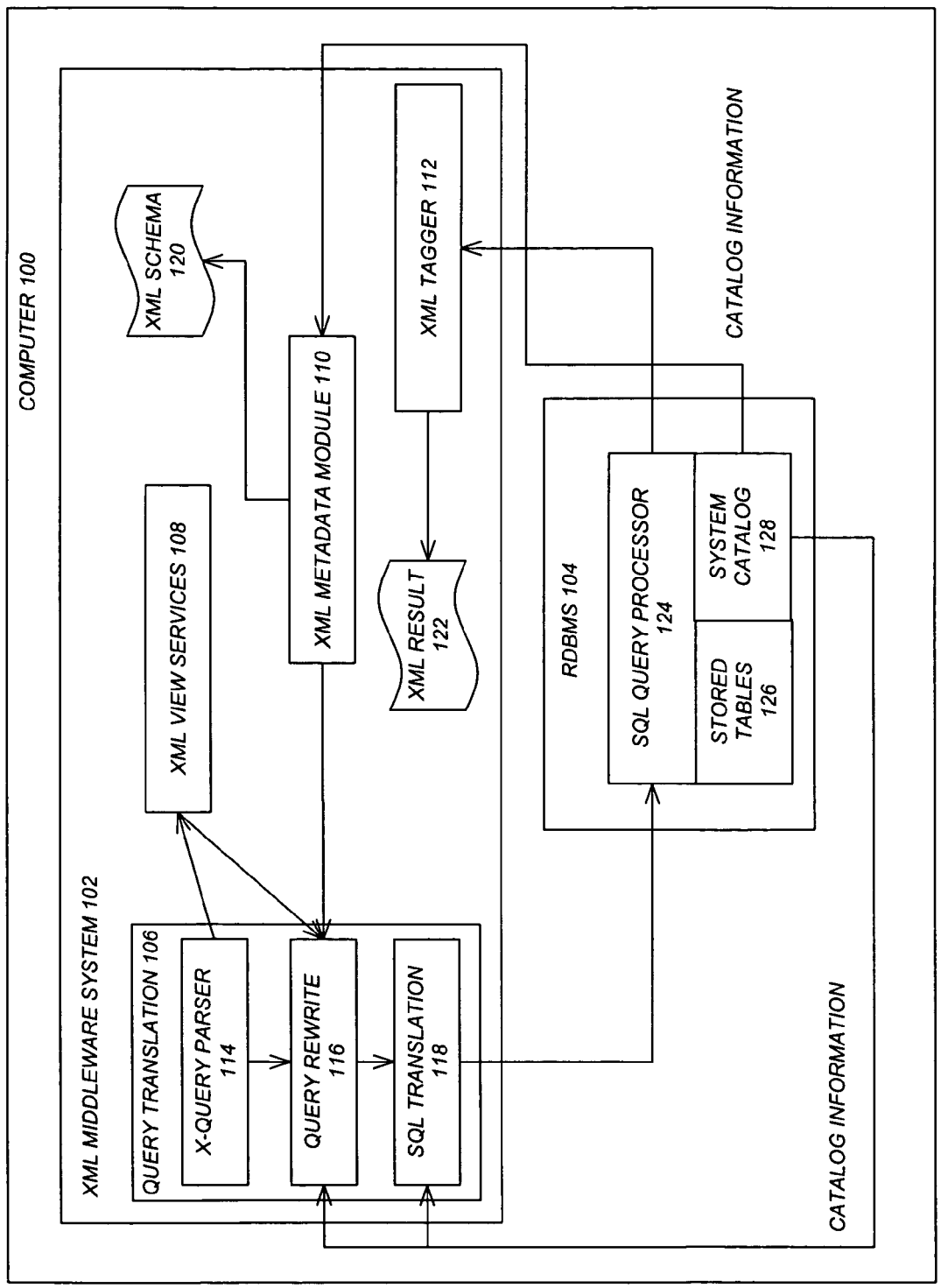
FIG. 1 illustrates the computer hardware environment of the present invention.

FIG. 1 illustrates an exemplary hardware and software environment that could be used with the preferred embodiment of the present invention. In the exemplary environment, a computer 100 executes an XML (eXtended Markup Language) middleware system 102 that interfaces to an object-relational database management system (RDBMS) 104 that manages one or more databases.

In the preferred embodiment of the present invention, the XML middleware system 102 and the RDBMS 104 may be executed on the same computer 100 or different computers 100. Moreover, the computer 100 may comprise a server on a network, such as the Internet, wherein the computer 100 is accessed by one or more client computers connected to the network. Those skilled in the art will recognize that the present invention can be used in any number of different hardware and software environments.

Also, in the preferred embodiment of the present invention, the XML middleware system 102 comprises the XPERANTO (Xml Publishing of Entities, Relationships, ANd Typed Objects) system offered by IBM Corporation, and the RDBMS 104 comprises the DataBase 2 (DB2™) Universal DataBase (UDB™) product offered by IBM Corporation. Those skilled in the art will recognize that the present invention has application to any XML middleware system and any DBMS, and may be implemented in many different types and brands of such systems.

Generally, the XML middleware system 102 and the RDBMS 104 each comprises logic and/or data that is embodied in or retrievable from a device, medium, signal or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, medium, signal or carrier.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

Operation of the XML Middleware System and RDBMS

The XML middleware system 102 provides a default XML view of existing relational databases managed by the RDBMS 104 and an XML query facility with which users can define new XML views. These views can also be queried using the same XML query facility, without the users having to learn or write SQL. The XML middleware system 102 translates XML queries into SQL queries, submits the SQL queries to the RDBMS 104 for execution, receives the results from the RDBMS 104, and then translates these results into XML documents.

As shown in FIG. 1, the XML middleware system 102 is organized into four components: Query Translation 106, XML View Services 108, XML Metadata Module 110, and XML Tagger 112. The Query Translation component 106 is organized into three sub-components: X-Query Parser 114, Query Rewrite 116, and SQL Translation 118. The functions performed by each of the components and sub-components are described below.

Query Translation 106: Translates the XML query language (X-Query) into an appropriate dialect of SQL for the RDBMS 104. This function is further sub-divided among the sub-components of Query Translation 106:

X-Query Parser 114: Takes X-Query statements and generates an XQGM (XML Query Graph Model), which is a language-neutral intermediate representation for the X-Query statements.

Query Rewrite 116: Optimizes the XQGM, resolves view references, performs XML view composition, and produces a semantically equivalent representation of the XQGM.

SQL Translation 118: Translates the XQGM to SQL statements for use by the RDBMS 104.

XML View Services 108: Serves as a storage and retrieval interface for X-Query view definitions. When views are defined, they are stored in a dedicated table. They can be later retrieved for view unfolding.

XML Metadata Module 110: Takes catalog information and produces XML schema information 120 for XML views and query results.

XML Tagger 112: Converts SQL query results into XML results 122, which typically comprise structured XML documents.

As shown in FIG. 1, the RDBMS 104 is organized into three components: SQL Query Processor 124, Stored Tables 126, and System Catalog 128. The functions performed by each of the components is described below.

SQL Query Processor 124: Processes and executes the SQL query received from Query Translation 106 and provides the results from that execution to the XML Tagger 112.

Stored Tables 126: The data stored in the relational database.

System Catalog 128: Meta-data concerning the Stored Tables 126.

Query Optimization and Execution

Figure 2:
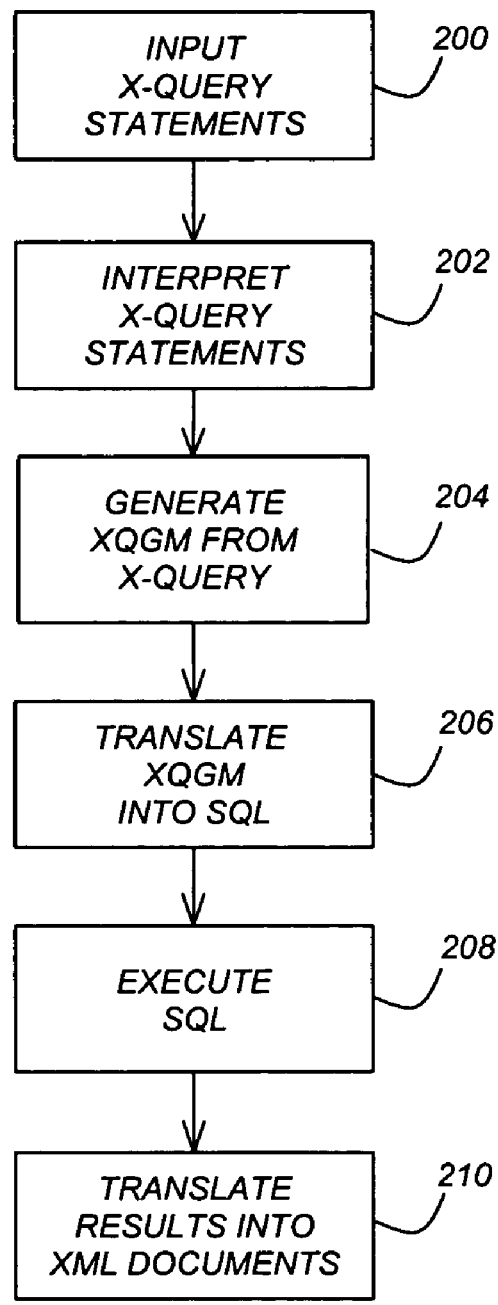
FIG. 2 is a flowchart illustrating the steps necessary for the optimization and execution of SQL statements according to the preferred embodiment of the present invention.

FIG. 2 is a flowchart illustrating the steps necessary for the optimization and execution of X-Query statements according to the preferred embodiment of the present invention. Block 200 represents the input of X-Query statements into the XML middleware system 102. Block 202 represents the XML middleware system 102 interpreting the X-Query statements. Block 204 represents the XML middleware system 102 generating the XQGM runtime structures from the X-Query statements.

An optimization function at Block 204 may transform or optimize the X-Query statements in a manner described in more detail later in this specification. Generally, the X-Query statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query.

Block 206 represents the XML middleware system 102 translating the XQGM into SQL statements and providing those SQL statements to the RDBMS 104 for execution. Block 208 represents the RDBMS 104 executing the SQL statements and providing the results therefrom back to the XML middleware system 102. Block 210 represents the XML middleware system 102 translating the results received from the RDBMS 104 into XML documents.

Description of the Optimization Technique

The present invention discloses an improved optimization technique that is typically performed at step 204 of FIG. 2 by the XML middleware system 102. As noted above, the improved optimization technique is known as Self Join Elimination Through Union.

The following query illustrates the self join elimination transformation through table expressions having UNION operators:

```
SELECT E1.SAL, E2.SAL
FROM (SELECT E1.NO, E1.SAL
   FROM EMP E3
   UNION
   SELECT E4.NO, E4.SAL
   FROM RICHEMP E4) AS E1 (NO, SAL),
   (SELECT E5.NO, E5.SAL
   FROM EMP E5
   UNION
   SELECT E6.NO, E6.SAL
   FROM RICHEMP E6) AS E2 (NO, SAL)
WHERE E1.NO=E2.NO AND E1.SAL=E2.SAL
```

The above query can be safely transformed into the following query, preserving its semantics:

```
SELECT E1.SAL, E1.SAL
FROM (SELECT E3.NO, E3.SAL
   FROM EMP E3
   UNION
   SELECT E4.NO, E4.SAL
   FROM RICHEMP E4) AS E1 (NO, SAL)
```

Since UNION is a duplicate eliminating operation, all result rows of the UNION have a unique combination of values across the list of attributes that are the UNION's result. In other words, a key can be inferred from the UNION, wherein the key contains all attributes in the UNION.

Other combinations of operators can produce these properties. For example, a UNION might not be a duplicate eliminating UNION (a UNION ALL operation does not eliminate duplicates), but can be a table expression in another duplicate eliminating operator.

For example, the following query illustrates these properties:

```
SELECT E1.SAL, E2.SA1
FROM (SELECT E.NO, E.SAL
   FROM (SELECT E.NO, E.SAL
      FROM EMP E
      UNION ALL
      SELECT E.NO, E.SAL
      FROM RICHEMP E) AS E (NO, SAL)
   GROUP BY E.NO, E.SAL) AS E1 (NO, SAL),
   (SELECT E.NO, E.SAL
   FROM (SELECT E.NO, E.SAL
      FROM EMP E
      UNION ALL
      SELECT E.NO, E.SAL
      FROM RICHEMP E) AS A (NO, SAL)
   GROUP BY E.NO, E.SAL) AS E2 (NO, SAL)
WHERE E1.NO=E2.NO AND E1.SAL=E2.SAL
```

The GROUP BY clause in the table expression guarantees that the combination of values produced by the UNION operation are distinct. The above query can be safely transformed into the following query:

```
SELECT E1.SAL, E1.SAL
FROM (SELECT E.NO, E.SAL
FROM (SELECT E.NO, E.SAL
   FROM EMP E
   UNION ALL
   SELECT E.NO, E.SAL
   FROM RICHEMP E) AS E (NO, SAL)
GROUP BY E.NO, E.SAL) AS E1 (NO, SAL),
```

While it is unlikely that query authors will compose such equi-join queries, this class of queries can result from internal transformations over views. This is the case for the XML middleware system 102 as described in the preferred embodiment.

In the preferred embodiment, self-join elimination through UNION is implemented as a rule-based transformation in the XML middleware system 102. As such, the transformation has two parts. The first part is the condition of the rule, and the second part is the action of the rule. Most rule-based systems are organized similarly.

The rule is performed for each quantifier (i.e., each quantifier in the query graph is individually passed as a parameter to the rule's condition and action). For each quantifier, the rule determines whether the quantifier is part of a self-join that can be eliminated.

The condition of the rule determines whether sufficient conditions for self-join elimination have been detected. These conditions include testing for the presence of self-join through UNION, but can also accommodate simpler queries.

The action part of the rule eliminates the quantifier from the query. The transformation includes rewriting expressions such that the quantified columns to be eliminated are substituted by other quantified columns in the same equivalence class. Once all quantified columns have been rewritten, the quantifier can be removed from the query.

Equivalence among quantified columns is determined by the presence of join predicates establishing equality among quantified columns. These predicate transformations also ensure that the query preserves its semantics with respect to null valued columns. For example, if the predicate "E1.NO=E2.NO" is transformed into the predicate "E1.NO=E1.NO", bindings for E1.NO which are null are excluded from the result in both cases.

Figure 3:
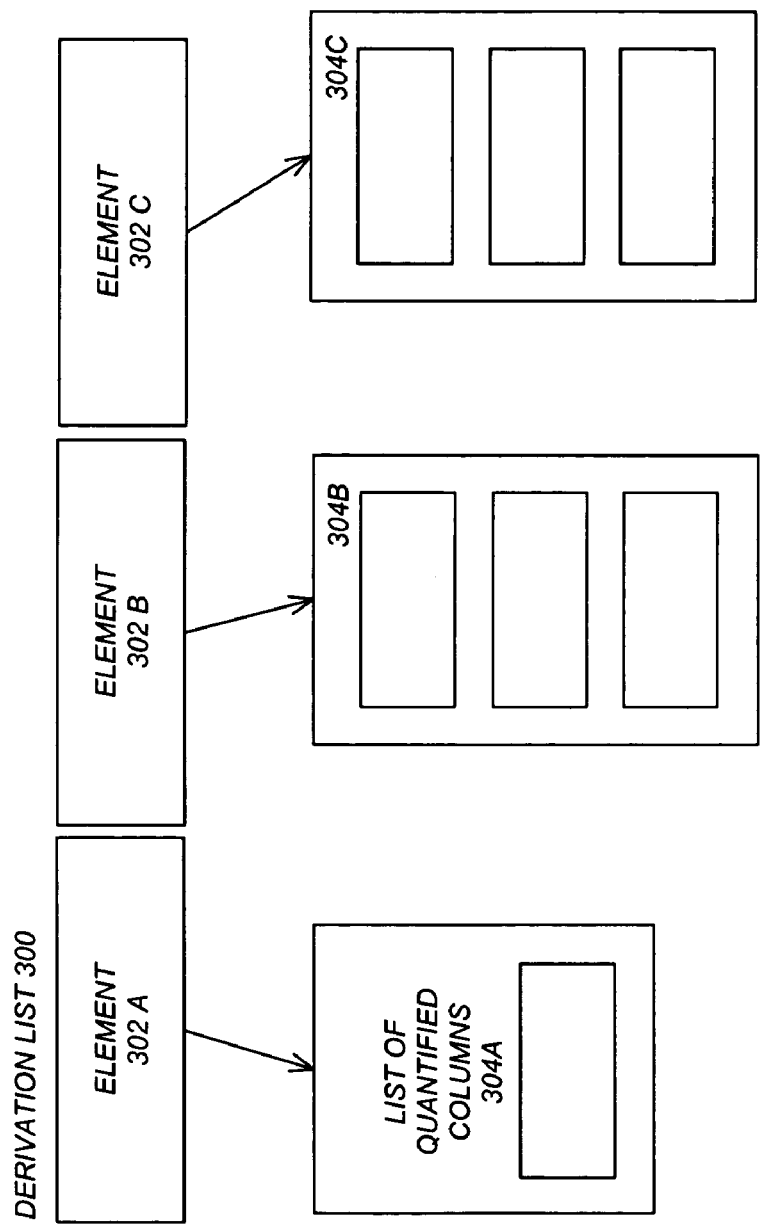
FIG. 3 is a block diagram that illustrates the data structure used to maintain a derivation list of quantified columns according to the preferred embodiment of the present invention.

Before presenting the general algorithm for self join elimination through UNION, the data structure used to maintain the derivation list of quantified columns is described. FIG. 3 is a block diagram that illustrates the data structure used to maintain a derivation list 300 of quantified columns according to the preferred embodiment of the present invention. Each element 302A, B, and C in the derivation list 300 is itself a list 304A, B, and C, which represents alternatives introduced due to UNION operators. Specifically, each list 304A, B, and C is a list of quantified columns. There is a single quantifier represented per list 304A, B, and C.

If no UNION operators are present, then each element 302A, B, C of the derivation list 300 contains a single list 304A, B, C of quantified columns (the first list 304A in the figure is an example). The next element 302A, B, C in the derivation list 300 is computed by examining the view or table expression over which a quantifier Q is derived, and for quantified columns in a list, the lower columns C from which the columns are derived are computed.

The list 304A, B, C is only considered for further processing if each lower column is implemented as either a column or a constant (i.e., columns implemented as complex expressions exclude the list of columns from the derivation list 300).

For each column in C, the list of equivalence classes is computed and the equivalence classes are divided among quantifiers.

A quantifier is only considered for further processing if it is represented in each equivalence class. For each remaining quantifier, the list of columns in each equivalence class is computed and these are added as the next element in the list of derivations.

If a UNION operator is present, then, for each quantifier over a UNION, the following element in the list of derivations has a number of lists equal to the number of branches in the UNION (i.e., each is obtained by following a branch of the UNION).

Two types of lists of derivations are computed using this method: Superset columns and Subset columns. The derivation list obtained for Superset columns does not allow predicates to appear between each level of the derivation, i.e., if a set of columns is derived from a view having a predicate, that branch of the derivation is not further explored. However, this restriction can be relaxed for predicates which are known not to restrict results belonging to a quantifier, e.g., a key-foreign key join in which the foreign key excludes null values.

The derivation list for Subset columns allows predicates to restrict the result between any level of the derivation. Aside from predicates, outer joins can also affect the derivation lists such that a quantifier bound to the left side of a left outer join operation does not restrict the bindings for that quantifier.

Figure 4:
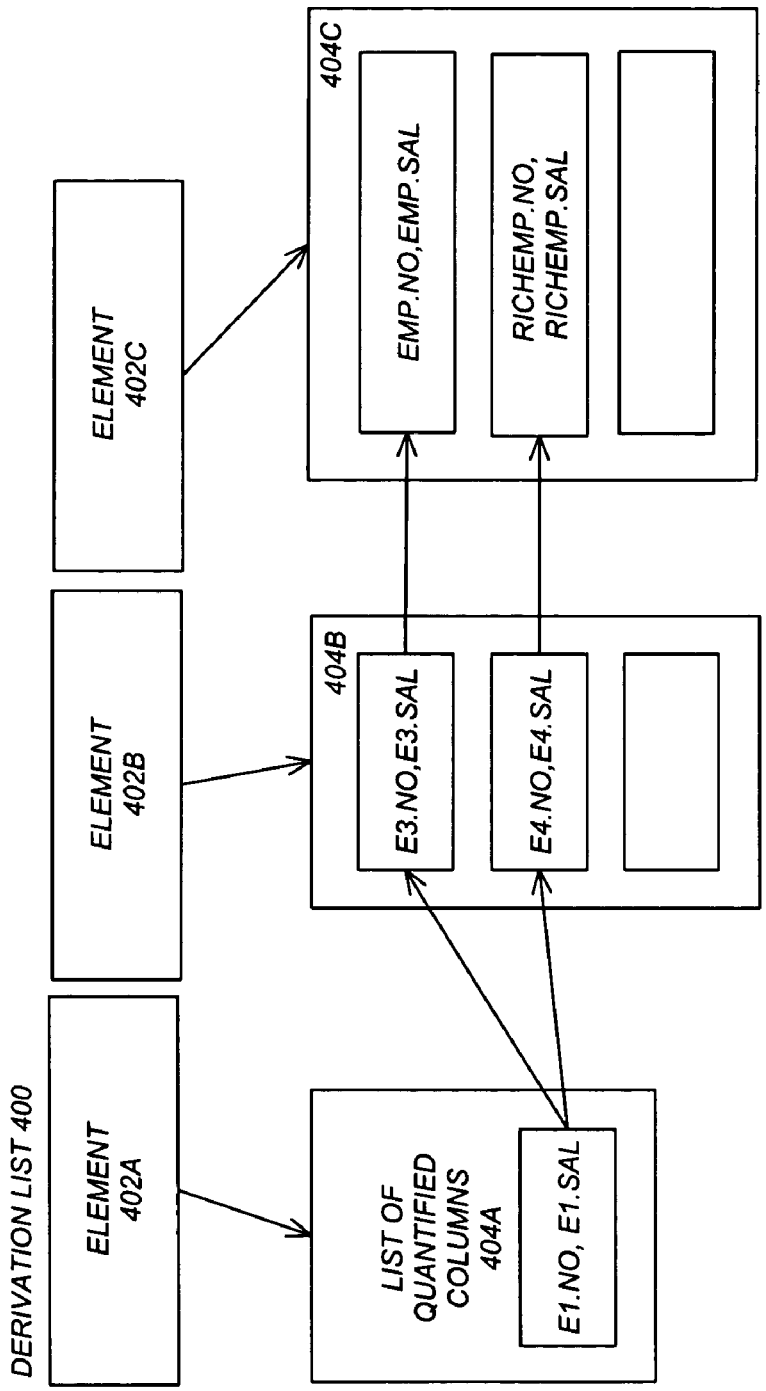
FIG. 4 is a block diagram that illustrates the data structure used to maintain a derivation list of Subset columns according to the preferred embodiment of the present invention.

FIG. 4 is a block diagram that illustrates the data structure used to maintain a derivation list 400 of Subset columns according to the preferred embodiment of the present invention. The first element 402A of the list 400 contains a list 404A comprising a column pair "E1.NO, E1.SAL," which is a key. The following element 402B contains two lists in 404B since it involves a UNION. The first list "E3.NO, E3.SAL" is obtained by following one branch of the UNION and the second list "E4.NO, E4.SAL" is derived by following the second branch of the UNION. The horizontal lines between the lists 404A, 404B, and 404C show the derivation paths for the column lists 404A, B, and C. The last element 402C in the derivation list 400 contains a list 404C of the columns belonging to the base tables EMP and RICHEMP that are referenced in respective branches of the UNION operation. Note that the derivation list for Superset columns is organized similarly to the example of FIG. 4 for Subset columns and is therefore not shown.

The general algorithm for this rewrite is described in terms of this data structure and it is separated into a condition part and an action part:

For each quantifier Qi in a query Q, if the condition part is true, then the action part is performed:

Condition

1. Qi is a FOR EACH quantifier. This is in contrast to, for example, an existential quantifier. In the example, quantifiers E1 and E2 qualify this test. In the sequel, it is assumed that quantifier E2 is being tested under the following conditions.

2. Qi is defined within a SELECT operator that implements an inner join. In the example, both quantifiers E1 and E2 are in a SELECT box with an inner join.

3. There are at least two quantifiers in the SELECT operator. In the example, the SELECT containing E2 has two quantifiers.

4. Equivalence classes among columns in the SELECT operator are divided into three classes:

A. Type 1 equivalence classes are sets of quantified columns over quantifiers other than Qi. There are no Type 1 equivalence classes in the example.

B. Type 2 equivalence classes are sets of quantified columns that reference Qi and at least one other quantifier Qj. There are two Type 2 equivalence classes in the example:
EQV1: {E1.NO, E2.NO}, EQV2: {E1.SAL, E2.SAL}.

C. Type 3 equivalence classes are sets of quantified columns that only reference Qi. If there are Type 3 equivalence classes, then the rule fails.

There are no Type 3 equivalence classes in the example.

5. For each set Si of Type 2 equivalence classes, separate quantified columns according to the quantifiers over which they range. The separation results in: EQV1: {{E1.NO}, {E2.NO}} and EQV2: {{E1.SAL}, {E2.SAL}}.

6. Enumerate all combinations of quantified columns KEY1, . . . , KEYn over Qi. There should be at most one combination, and there should be at most a single quantified column over Qi in an equivalence class. In the example, there is a single combination for E2 in the example: (E2.NO, E2.SAL).

7. Retain only those Qi where KEYi comprises key columns. In the example, the combination (E2.NO, E2.SAL) forms a key.

8. Compute the derivation of Superset columns from which KEYi is derived and append them to KEYi. In the example, the derivation is {(E2.NO, E2.SAL), ((E5.NO, E5.SAL), (E6.NO, E6.SAL)), ((EMP.NO, EMP.SAL), (RICHEMP.NO, RICHEMP.SAL))}.

9. For each quantifier Qj in the SELECT operator where Qj<>Qi, if Qj has a quantified column in each Type 2 equivalence class, then perform the following steps. (Note that there might be more than a single quantified column referencing Qj in an equivalence class. In the example, quantifier E1 qualifies since it is represented in both equivalence classes EQV1 and EQV2. This leads to more alternatives in forming lists of quantified columns and possible matches.)

A. Compute the derivation of Subset columns from which Qi is derived. In the example, the derivation list for quantifier E1 is {(E1.NO, E1.SAL), ((E3.NO, E1.SAL), (E4.NO, E4.SAL)), ((EMP.NO, EMP.SAL), (RICHEMP.NO, RICHEMP.SAL))}.

B. For each derivation in Qi:
 i. For all lists of quantified columns in the derivation:
  I. If the list of quantified columns does not match any list of quantified columns in KEYi, the rule fails. In the example, the lists match on the pairs {((EMP.NO, EMP.SAL), (RICHEMP.NO, RICHEMP.SAL))}.

10. The rule succeeds. In the example, quantifier E2 passes the condition of the rule. Note that the rule also would have been performed had E1 been used as a candidate quantifier instead of E2.

Action

1. For each Type 2 equivalence class:
A. Replace all occurrences of quantified columns over Qi with quantified columns in the same Type 2 equivalence class. In the example, all occurrences of E2.NO are replaced with E1.NO, and all occurrences of E2.SAL are replaced with E1.SAL.

2. Remove Qi from the query. In the example, quantifier E2 is removed from the query.

Logic of the Optimization Technique

FIGS. 5A-5D together are a flowchart illustrating the method of optimizing queries in step 202 of FIG. 2 according to the preferred embodiment of the present invention. Specifically, this flowchart further describes the logic of the rule above that implements the preferred embodiment of the present invention for each quantifier Qi in a query.

As noted above, the rule is comprised of two parts. Blocks 500-526 represent the condition parts of the rule, and Blocks 528-532 represent the action parts of the rule. The logic of these different blocks are described in more detail below.

Figure 5A:
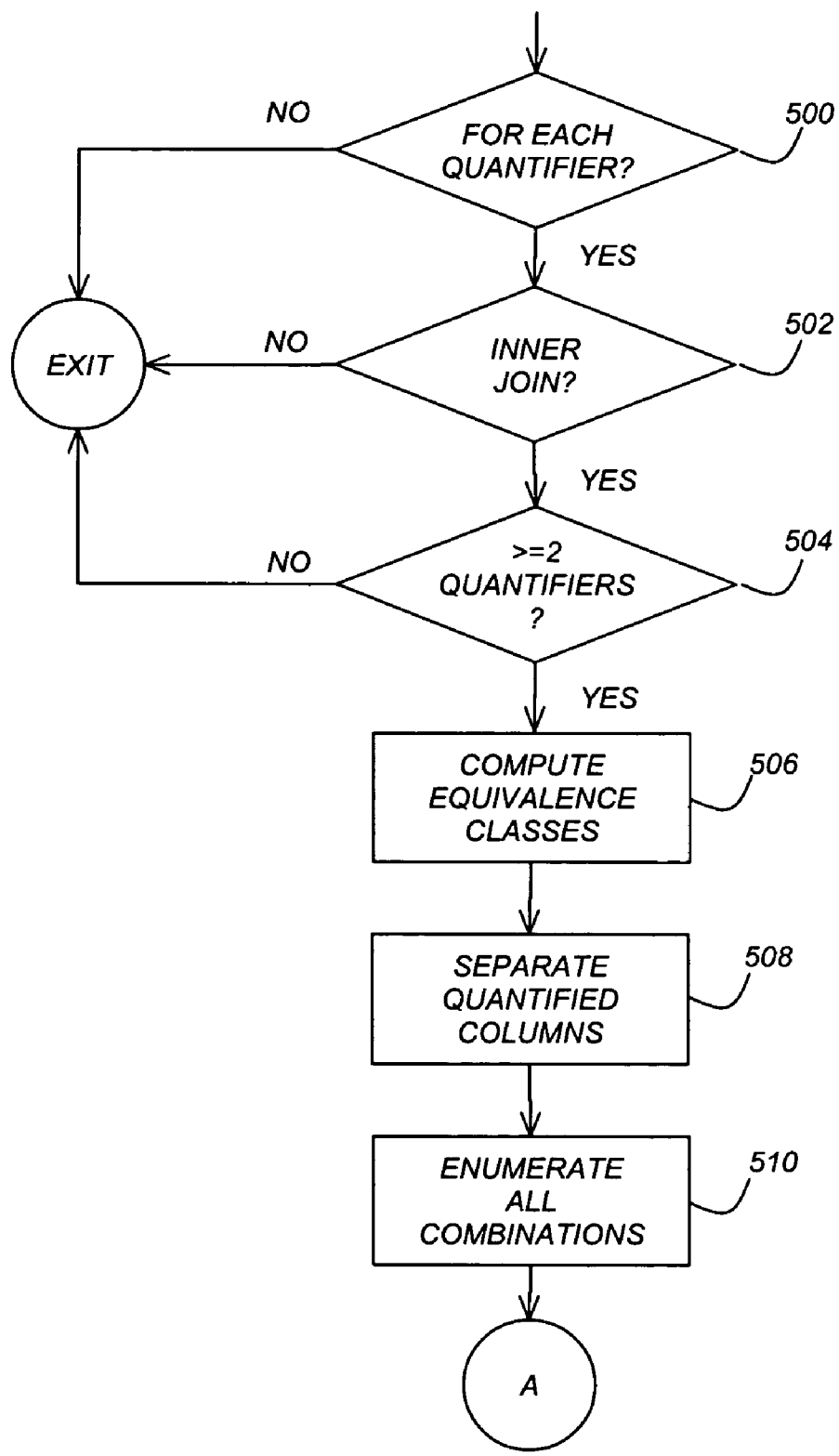
FIGS. 5A-5D together are a flowchart illustrating the method of optimizing queries in step 202 of FIG. 2 according to the preferred embodiment of the present invention

Referring initially to FIG. 5A, Block 500 is a decision block that represents the XML middleware system 102 determining whether Qi is a FOR EACH quantifier. If not, control exits the flowchart to terminate the logic; otherwise, control transfers to Block 502.

Block 502 is a decision block that represents the XML middleware system 102 determining whether Qi is defined within a SELECT operator that implements an inner join. If not, control exits the flowchart to terminate the logic; otherwise, control transfers to Block 504.

Block 504 is a decision block that represents the XML middleware system 102 determining whether there are at least two quantifiers Qi and Qj in the SELECT operator. If not, control exits the flowchart to terminate the logic; otherwise, control transfers to Block 506.

Block 506 represents the XML middleware system 102 computing equivalence classes among columns in the SELECT operator. These computed equivalence classes are divided into three classes: (a) Type 1 equivalence classes are sets of quantified columns over quantifiers other than Qi; (b) Type 2 equivalence classes are sets of quantified columns that reference Qi and at least one other quantifier Qj; and (c) Type 3 equivalence classes are sets of quantified columns that only reference Qi.

Block 508 represents the XML middleware system 102, for each set Si of the Type 2 equivalence classes, separating quantified columns according to the quantifiers over which they range.

Block 510 represents the XML middleware system 102 enumerating quantified columns KEY1, . . . , KEYn over Qi. Note that there might be more than a single quantified column over Qi in an equivalence class. This causes the rule to fail.

Figure 5B:
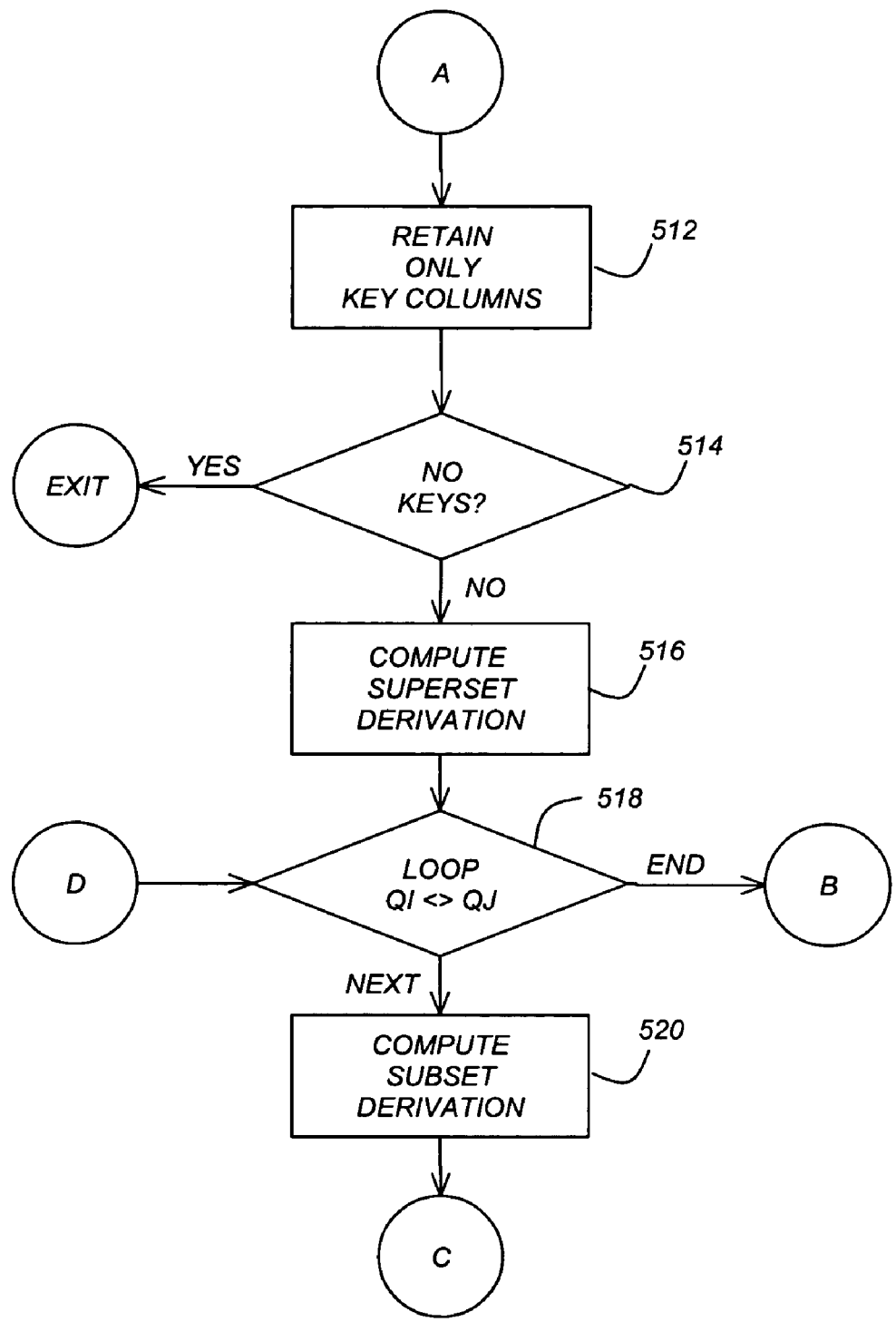

Thereafter, control transfers to Block 512 in FIG. 5B via "A".

Referring to FIG. 5B, Block 512 represents the XML middleware system 102 retaining only those KEYi that comprise key columns.

Block 514 is a decision block that represents the XML middleware system 102 determining if no such retained combination KEYi exists (i.e., for the condition part of the rule to be true, there must be at least one retained combination KEYi). If so, control exits the flowchart to terminate the logic; otherwise, control transfers to Block 516.

Block 516 represents the XML middleware system 102 computing the derivation of Superset columns from which KEYi is derived and adding them to KEYi.

Block 518 is a decision block that represents the XML middleware system 102 performing a loop for each quantifier Qj in the SELECT operator where Qj<>Qi, if Qj has a quantified column in each Type 2 equivalence class. For each iteration of the loop, control transfers to Block 520; upon completion of the loop, control transfers to Block 528 in FIG. 5D via "B".

Block 520 represents the XML middleware system 102 computing the derivation of Subset columns from which Qi is derived.

Figure 5C:
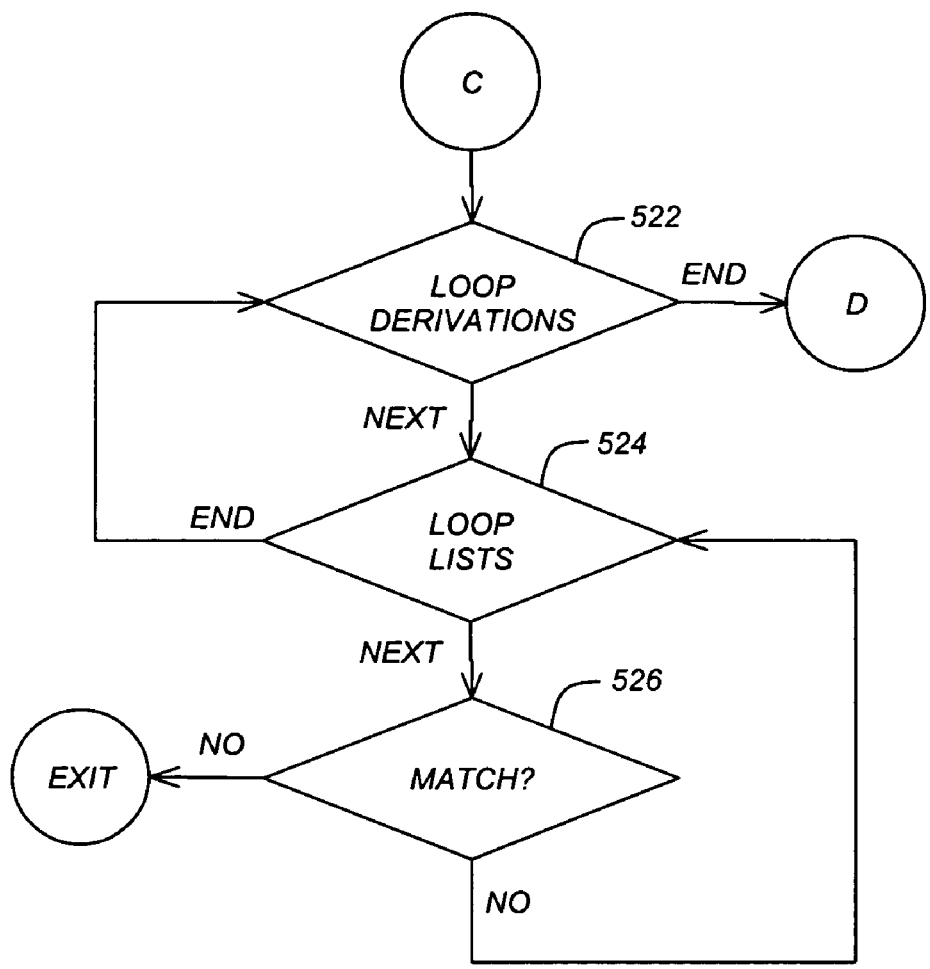

Thereafter, control transfers to Block 522 in FIG. 5C via "C".

Referring to FIG. 5C, Block 522 is a decision block that represents the XML middleware system 102 performing a loop for each derivation in Qi. For each iteration of the loop, control transfers to Block 524; upon completion of the loop, control transfers to Block 518 in FIG. 5B via "C".

Block 524 is a decision block that represents the XML middleware system 102 performing a loop for all lists of quantified columns in the derivation. For each iteration of the loop, control transfers to Block 526; upon completion of the loop, control transfers to Block 522.

Block 526 is a decision block that represents the XML middleware system 102 determining whether the list of quantified columns matches any list of quantified columns in KEYi. If not, control exits the flowchart to terminate the logic; otherwise, control transfers to Block 524.

Figure 5D:
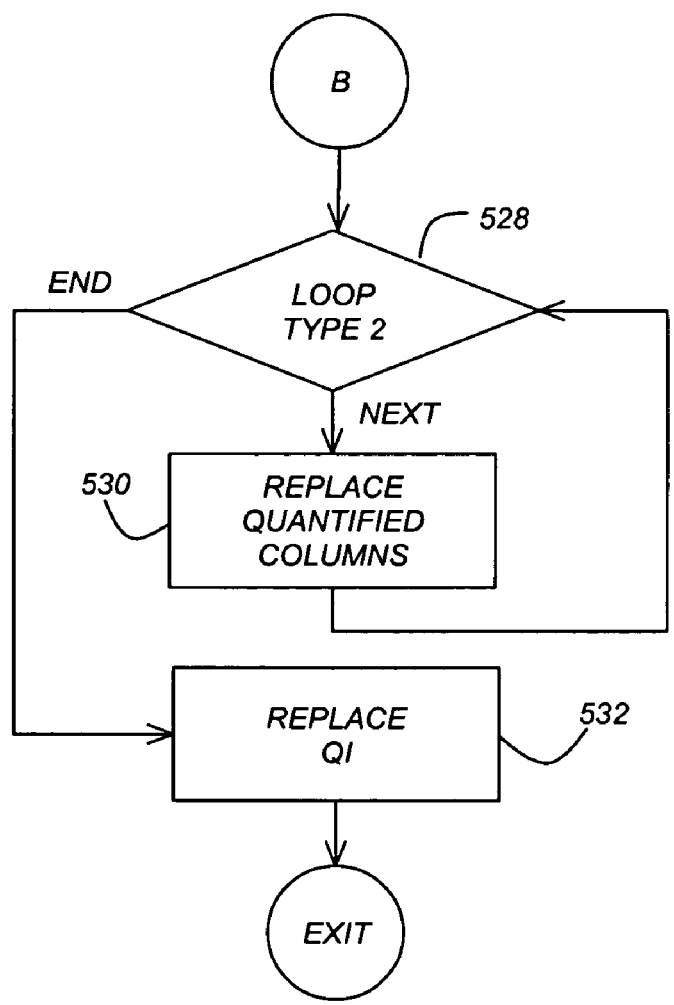

Referring to FIG. 5D, Block 528 is a decision block that represents the XML middleware system 102 performing a loop for each Type 2 equivalence class. For each iteration of the loop, control transfers to Block 530; upon completion of the loop, control transfers to Block 532.

Block 530 represents the XML middleware system 102 replacing all occurrences of quantified columns over Qi with quantified columns in the same Type 2 equivalence class.

Block 532 represents the XML middleware system 102 removing Qi from the query.

Finally, control exits the flowchart to terminate the logic.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any database management system could benefit from the present invention.

In summary, the present invention discloses a method, apparatus, and article of manufacture for optimizing left outer join queries. The query optimization technique determines whether a query includes a self join that is transitively derived through table expressions having UNION operators. If so, the query is simplified to eliminate the table expressions and to reduce the query to an equivalent query over tables.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of optimizing a query performed by a computer to retrieve data from a database, comprising:
    (a) determining whether a query includes a self join that is transitively derived through table expressions having UNION operators; and
    (b) simplifying the query to eliminate the table expressions and to reduce the query to an equivalent query over tables, when the query includes the self join that is transitively derived through the table expressions having the UNION operators.

2. The method of claim 1, wherein the determining step (a) and simplifying step (b) are performed for each quantifier in the query, in order to determine whether the quantifier is part of the self-join that is transitively derived through table expressions having UNION operators.

3. The method of claim 2, wherein the simplifying step (b) comprises: rewriting the table expressions such that quantified columns to be eliminated are substituted by other quantified columns in a same equivalence class; and once all quantified columns have been rewritten, removing the quantifier from the query.

4. The method of claim 3, wherein the equivalence class is determined by the presence of join predicates establishing equality among quantified columns.

5. The method of claim 3, wherein the quantifier is only considered for elimination when it is represented in each equivalence class.

6. The method of claim 1, wherein the determining step (a) and simplifying step (b) are implemented as a rule-based transformation, the determining step (a) comprises a condition part of the rule, and the simplifying step (b) comprises an action part of the rule that is performed when the condition part is true.

7. The method of claim 6, wherein the condition part of the rule requires:
   (1) that a quantifier Qi in the query is a FOR EACH quantifier;
   (2) that Qi is defined within a SELECT operator that implements an inner join;
   (3) that there are at least two quantifiers Qi and Qj in the SELECT operator;
   (4) computing equivalence classes among columns in the SELECT operator, wherein the equivalence classes are divided into three classes:
      (A) Type 1 equivalence classes are sets of quantified columns over quantifiers other than Qi;
      (B) Type 2 equivalence classes are sets of quantified columns that reference Qi and at least one other quantifier Qj;
      (C) Type 3 equivalence classes are sets of quantified columns that only reference Qi;
   (5) for each set Si of Type 2 equivalence classes, separating quantified columns according to the quantifiers over which they range;
   (6) enumerating all combinations of quantified columns KEY1, . . . , KEYn over Qi;
   (7) retaining only those Qi where KEYi comprises key columns;
   (8) computing the derivation of Superset columns from which KEYi is derived and adding them to KEYi;
   (9) for each quantifier Qj in the SELECT operator where Qj<>Qi, if Qj has a quantified column in each Type 2 equivalence class:
      (A) computing the derivation of Subset columns from which Qi is derived;
      (B) for each derivation in Qi:
         (i) for all lists of quantified columns in the derivation:
            (I) the list of quantified columns matches at least one list of quantified columns in KEYi.

8. The method of claim 6, wherein the action part of the rule requires:
   (1) for each Type 2 equivalence class:
      (a) replacing all occurrences of quantified columns over Qi with quantified columns in the same Type 2 equivalence class;
   (2) removing Qi from the query.

9. A computer-implemented apparatus for optimizing a query, comprising:
   a computer, wherein the query is performed in the computer to retrieve data from a database; logic, performed by the computer system, for:
      (a) determining whether a query includes a self join that is transitively derived through table expressions having the UNION operators; and
      (b) simplifying the query to eliminate the table expressions and to reduce the query to an equivalent query over tables, when the query includes the self join that is transitively derived through the table expressions having the UNION operators.

10. The apparatus of claim 9, wherein the logic for determining (a) and logic for simplifying (b) are performed for each quantifier in the query, in order to determine whether the quantifier is part of the self-join that is transitively derived through table expressions having UNION operators.

11. The apparatus of claim 10, wherein the logic for simplifying (b) comprises logic for:
   rewriting the table expressions such that the quantified columns to be eliminated are substituted by other quantified columns in a same equivalence class; and once all quantified columns have been rewritten, removing the quantifier from the query.

12. The apparatus of claim 11, wherein the equivalence class is determined by the presence of join predicates establishing equality among quantified columns.

13. The apparatus of claim 11, wherein the quantifier is only considered for elimination when it is represented in each equivalence class.

14. The apparatus of claim 9, wherein the logic for determining (a) and logic for simplifying (b) are implemented as a rule-based transformation, the logic for determining (a) comprises a condition part of the rule, and the logic for simplifying (b) comprises an action part of the rule that is performed when the condition part is true.

15. The apparatus of claim 14, wherein the condition part of the rule requires:
   (1) that a quantifier Qi in the query is a FOR EACH quantifier;
   (2) that Qi is defined within a SELECT operator that implements an inner join;
   (3) that there are at least two quantifiers Qi and Qj in the SELECT operator;
   (4) computing equivalence classes among columns in the SELECT operator, wherein the equivalence classes are divided into three classes:
      (A) Type 1 equivalence classes are sets of quantified columns over quantifiers other than Qi;
      (B) Type 2 equivalence classes are sets of quantified columns that reference Qi and at least one other quantifier Qj;
      (C) Type 3 equivalence classes are sets of quantified columns that only reference Qi;
   (5) for each set Si of Type 2 equivalence classes, separating quantified columns according to the quantifiers over which they range;
   (6) enumerating all combinations of quantified columns KEY1, . . . , KEYn over Qi;
   (7) retaining only those Qi where KEYi comprises key columns;
   (8) computing the derivation of Superset columns from which KEYi is derived and adding them to KEYi;
   (9) for each quantifier Qj in the SELECT operator where Qj<>Qi, if Qj has a quantified column in each Type 2 equivalence class:
      (A) computing the derivation of Subset columns from which Qi is derived;
      (B) for each derivation in Qi:
         (i) for all lists of quantified columns in the derivation:
            (I) the list of quantified columns matches at least one list of quantified columns in KEYi.

16. The apparatus of claim 14, wherein the action part of the rule requires:
(1) for each Type 2 equivalence class:
(a) replacing all occurrences of quantified columns over Qi with quantified columns in the same Type 2 equivalence class;
(2) removing Qi from the query.

17. An article of manufacture comprising a computer-readable device embodying instructions that, when read and executed by a computer, comprise logic for optimizing a query performed in the computer to retrieve data from a database, the logic comprising:
(a) determining whether a query includes a self join that is transitively derived through table expressions having the UNION operators; and
(b) simplifying the query to eliminate the table expressions and to reduce the query to an equivalent query over tables, when the query includes the self join that is transitively derived through the table expressions having the UNION operators.

18. The article of manufacture of claim 17, wherein the determining step (a) and simplifying step (b) are performed for each quantifier in the query, in order to determine whether the quantifier is part of the self-join that is transitively derived through table expressions having UNION operators.

19. The article of manufacture of claim 18, wherein the simplifying step (b) comprises:
rewriting the table expressions such that the quantified columns to be eliminated are substituted by other quantified columns in a same equivalence class; and once all quantified columns have been rewritten, removing the quantifier from the query.

20. The article of manufacture of claim 19, wherein the equivalence class is determined by the presence of join predicates establishing equality among quantified columns.

21. The article of manufacture of claim 19, wherein the quantifier is only considered for elimination when it is represented in each equivalence class.

22. The article of manufacture of claim 17, wherein the determining step (a) and simplifying step (b) are implemented as a rule-based transformation, the determining step (a) comprises a condition part of the rule, and the simplifying step (b) comprises an action part of the rule that is performed when the condition part is true.

23. The article of manufacture of claim 22, wherein the condition part of the rule requires:
(1) that a quantifier Qi in the query is a FOR EACH quantifier;
(2) that Qi is defined within a SELECT operator that implements an inner join;
(3) that there are at least two quantifiers Qi and Qj in the SELECT operator;
(4) computing equivalence classes among columns in the SELECT operator, wherein the equivalence classes are divided into three classes:
(A) Type 1 equivalence classes are sets of quantified columns over quantifiers other than Qi;
(B) Type 2 equivalence classes are sets of quantified columns that reference Qi and at least one other quantifier Qj;
(C) Type 3 equivalence classes are sets of quantified columns that only reference Qi;
(5) for each set Si of Type 2 equivalence classes, separating quantified columns according to the quantifiers over which they range;
(6) enumerating all combinations of quantified columns KEY1, . . . , KEYn over Qi;
(7) retaining only those Qi where KEYi comprises key columns;
(8) computing the derivation of Superset columns from which KEYi is derived and adding them to KEYi;
(9) for each quantifier Qj in the SELECT operator where Qj<>Qi, if Qj has a quantified column in each Type 2 equivalence class:
(A) computing the derivation of Subset columns from which Qi is derived;
(B) for each derivation in Qi:
(i) for all lists of quantified columns in the derivation:
(I) the list of quantified columns matches at least one list of quantified columns in KEYi.

24. The article of manufacture of claim 22, wherein the action part of the rule requires:
(1) for each Type 2 equivalence class:
(a) replacing all occurrences of quantified columns over Qi with quantified columns in the same Type 2 equivalence class;
(2) removing Qi from the query.

* * * * *